(12) United States Patent
Peterson et al.

(10) Patent No.: US 11,989,041 B2
(45) Date of Patent: May 21, 2024

(54) DECREASING A HUMIDITY LEVEL IN AN INFORMATION HANDLING SYSTEM

(71) Applicant: Dell Products L.P., Round Rock, TX (US)

(72) Inventors: Chris E. Peterson, Austin, TX (US);
Sandor Farkas, Round Rock, TX (US);
Steven T. Embleton, Austin, TX (US);
Jon T. Fitch, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 348 days.

(21) Appl. No.: 17/647,690

(22) Filed: Jan. 11, 2022

(65) Prior Publication Data

US 2023/0221738 A1 Jul. 13, 2023

(51) Int. Cl.
| | |
|---|---|
| *G05D 22/02* | (2006.01) |
| *B01D 49/00* | (2006.01) |
| *B01D 53/00* | (2006.01) |
| *B01D 53/26* | (2006.01) |
| *B01D 53/30* | (2006.01) |
| *G06F 11/30* | (2006.01) |
| *G10K 15/04* | (2006.01) |

(52) U.S. Cl.
CPC ........... *G05D 22/02* (2013.01); *B01D 49/006* (2013.01); *B01D 53/007* (2013.01); *B01D 53/265* (2013.01); *B01D 53/30* (2013.01); *G10K 15/04* (2013.01); *B01D 2259/816* (2013.01); *G06F 11/3058* (2013.01)

(58) Field of Classification Search
None
See application file for complete search history.

(56) References Cited

U.S. PATENT DOCUMENTS

2020/0329742 A1* 10/2020 Tanaka ................ A47J 37/1271
2022/0080136 A1* 3/2022 Teh ........................ A61B 1/005

\* cited by examiner

*Primary Examiner* — Gabriel E Gitman
(74) *Attorney, Agent, or Firm* — McDermott Will & Emery LLP

(57) ABSTRACT

In one embodiment, a method for decreasing a humidity level in an information handling system includes: receiving, by a sound field chamber, an incoming airflow, the incoming airflow having a humidity level corresponding to an amount of water vapor in the incoming airflow; identifying, by a humidity controller, the humidity level of the incoming airflow; determining, by the humidity controller, that the humidity level is greater than a threshold humidity level; and in response to determining that the humidity level is greater than the threshold humidity level: causing, by the humidity controller, a sound source of the information handling system to generate a sound field within the sound field chamber, the sound field comprised of sound waves, the sound waves causing an acoustic agglomeration of the water vapor, the acoustic agglomeration causing the humidity level to decrease.

20 Claims, 5 Drawing Sheets

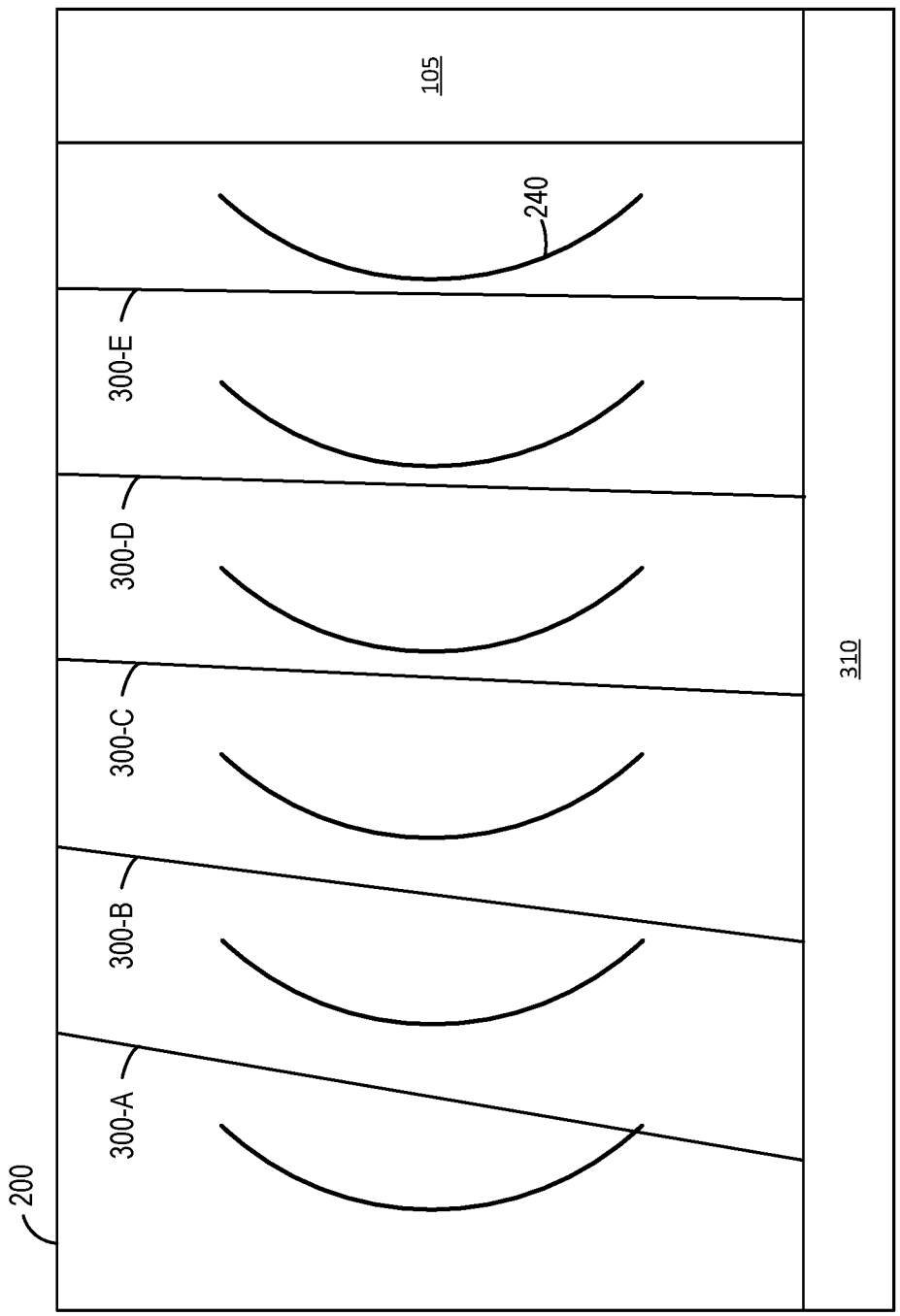

DECREASING A HUMIDITY LEVEL IN AN INFORMATION HANDLING SYSTEM

BACKGROUND

Field of the Disclosure

The disclosure relates generally to information handling systems, and in particular to decreasing a humidity level in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for decreasing a humidity level in an information handling system includes: receiving, by a sound field chamber of the information handling system, an incoming airflow, the incoming airflow having a humidity level corresponding to an amount of water vapor in the incoming airflow; identifying, by a humidity controller of the information handling system, the humidity level of the incoming airflow; determining, by the humidity controller, that the humidity level is greater than a threshold humidity level; and in response to determining that the humidity level is greater than the threshold humidity level: causing, by the humidity controller, a sound source of the information handling system to generate a sound field within the sound field chamber, the sound field comprised of sound waves, the sound waves causing an acoustic agglomeration of the water vapor, the acoustic agglomeration causing the humidity level to decrease.

In one or more of the disclosed embodiments, identifying the humidity level of the incoming airflow includes: receiving, by the humidity controller, humidity level data from one or more sensors of the information handling system, the humidity level data captured by the one or more sensors; and determining, by the humidity controller, the humidity level based on the humidity level data.

In one or more of the disclosed embodiments, determining that the humidity level is greater than the threshold humidity level includes: accessing, by the humidity controller, a local storage resource of the information handling system, the local storage resource storing the threshold humidity level; identifying, by the humidity controller, the threshold humidity level; and comparing, by the humidity controller, the humidity level to the threshold humidity level.

In one or more of the disclosed embodiments, causing the sound source to generate the sound field includes: accessing, by the humidity controller, a local storage resource of the information handling system, the local storage resource storing an acoustic frequency and a sound pressure level, the acoustic frequency and the sound pressure level associated with the sound field; and causing, by the humidity controller, the sound source to generate the sound field based on the acoustic frequency and the sound pressure level.

In one or more of the disclosed embodiments, the acoustic frequency associated with the sound field is an ultrasonic frequency.

In one or more of the disclosed embodiments, the acoustic frequency associated with the sound field is a high frequency.

In one or more of the disclosed embodiments, the acoustic frequency associated with the sound field is a low frequency.

In one or more of the disclosed embodiments, the method further includes: causing, by one or more condensation structures of the information handling system, a condensation in the water vapor, the one or more condensation structures disposed within the sound field chamber, each of the one or more condensation structures comprised of a hydrophilic material.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 3 is a block diagram of selected elements of an embodiment of a sound field chamber that includes one or more condensation structures.

DESCRIPTION OF PARTICULAR EMBODIMENT(S)

Figure 1:
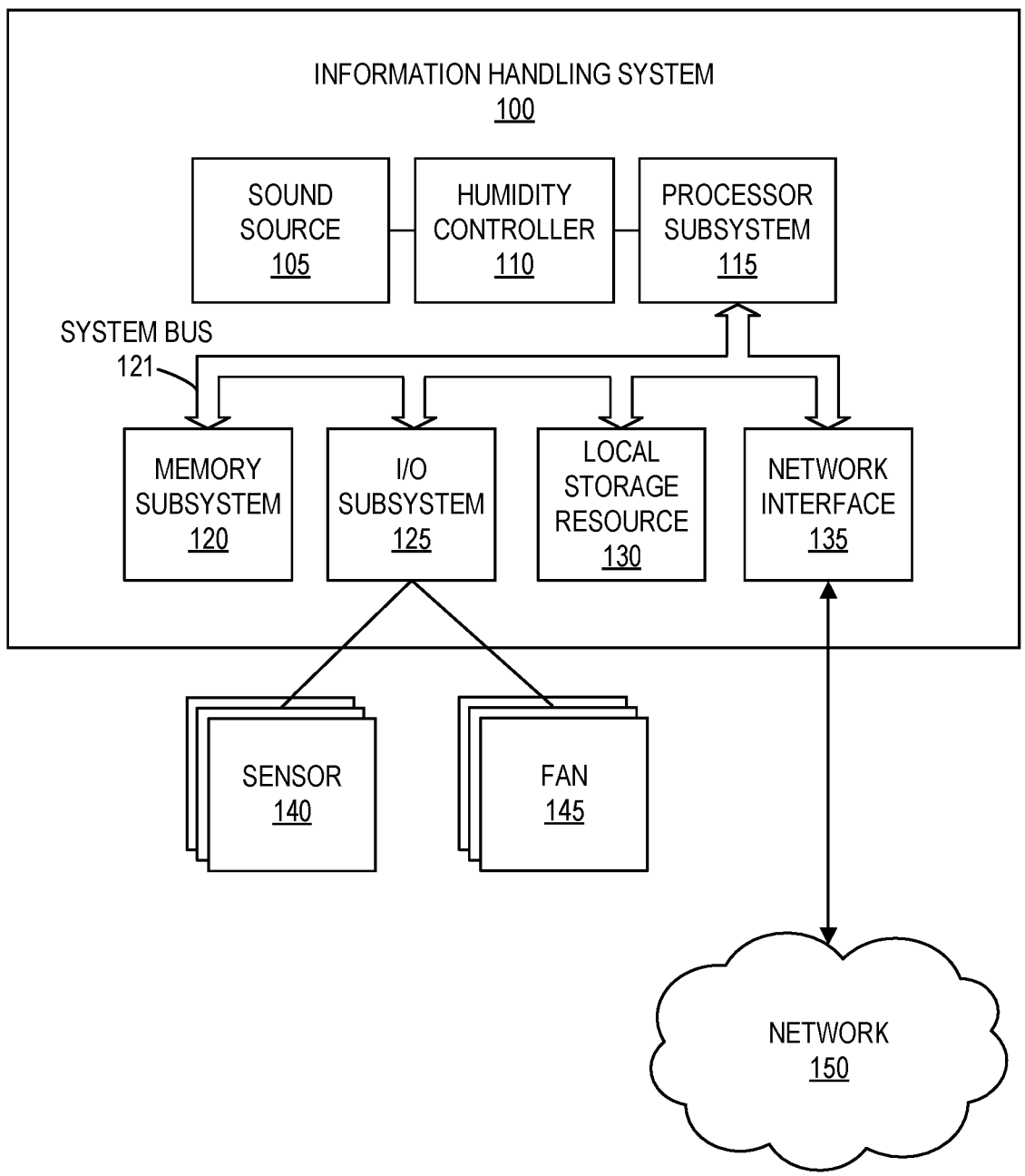
FIG. 1 is a block diagram of selected elements of an embodiment of a computing environment that includes an information handling system.

This document describes a method for decreasing a humidity level in an information handling system includes: receiving, by a sound field chamber of the information handling system, an incoming airflow, the incoming airflow having a humidity level corresponding to an amount of water vapor in the incoming airflow; identifying, by a humidity controller of the information handling system, the humidity level of the incoming airflow; determining, by the humidity controller, that the humidity level is greater than a threshold humidity level; and in response to determining that the humidity level is greater than the threshold humidity level: causing, by the humidity controller, a sound source of the information handling system to generate a sound field within the sound field chamber, the sound field comprised of sound waves, the sound waves causing an acoustic agglomeration of the water vapor, the acoustic agglomeration causing the humidity level to decrease.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 115, which may comprise one or more processors, and system bus 121 that communicatively couples various system components to processor subsystem 115 including, for example, a memory subsystem 120, an I/O subsystem 125, a local storage resource 130, and a network interface 135. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a sound source 105, a humidity controller 110, one or more sensors 140, and one or more fans 145. In other embodiments, information handling system 100 may include additional, fewer, and/or different components than the components shown in the embodiment illustrated in FIG. 1.

In information handling system 100, processor subsystem 115 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 115 may interpret and/or execute program instructions and/or process data stored locally (e.g., in memory subsystem 120 and/or another component of information handling system 100). In the same or alternative embodiments, processor subsystem 115 may interpret and/or execute program instructions and/or process data stored remotely. In one embodiment, processor subsystem 115 may be or include a multi-core processor comprised of one or more central processing units (CPUs) disposed upon an integrated circuit (IC) chip. In other embodiments, processor subsystem 115 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 120 may comprise a system, device, or apparatus operable to retain and/or retrieve program instructions and/or data for a period of time (e.g., computer-readable media). Memory subsystem 120 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 125 may comprise a system, device, or apparatus generally operable to receive and/or transmit data to, from, and/or within information handling system 100. I/O subsystem 125 may represent, for example, a variety of communication interfaces, graphics interfaces, video interfaces, user input interfaces, and/or peripheral interfaces. In various embodiments, I/O subsystem 125 may be used to support various peripheral devices, such as a touch panel, a display adapter, a keyboard, an accelerometer, a touch pad, a gyroscope, an IR sensor, a microphone, a sensor, a camera, or another type of peripheral device. In the embodiment illustrated in FIG. 1, I/O subsystem 125 may be communicably coupled to one or more sensors 140 and/or one or more fans 145.

In one embodiment, local storage resource 130 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one embodiment, network interface 135 may be a suitable system, apparatus, or device operable to serve as an interface between information handling system 100 and a network 150. Network interface 135 may enable information handling system 100 to communicate over network 150 using a suitable transmission protocol and/or standard, including, but not limited to, transmission protocols and/or standards enumerated below with respect to the discussion of network 150. Network 150 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 135 may enable wired and/or wireless communications (e.g., NFC or Bluetooth) to and/or from information handling system 100.

In particular embodiments, network 150 may include one or more routers for routing data between client information handling systems 100 and server information handling systems 100. A device (e.g., a client information handling system 100 or a server information handling system 100) on network 150 may be addressed by a corresponding network address including, for example, an Internet protocol (IP) address, an Internet name, a Windows Internet name service (WINS) name, a domain name or other system name. In particular embodiments, network 150 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 150 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 150 and its various components may be implemented using hardware, software, or any combination thereof.

In one embodiment, each sensor 140 (collectively referred to herein as "sensors 140") may be a suitable system, apparatus, or device operable to capture information associated with information handling system 100. In particular, sensors 140 may be disposed throughout information handling system 100 (e.g., within sound field chamber 200 shown in FIGS. 2A-2C) and/or computing environment 155 such that sensors 140 may capture environmental information associated with physical parameters of information handling system 100 (e.g., humidity level, corrosion level, and the like). In one embodiment, sensors 140 may be or include one or more humidity sensors and/or corrosion sensors operable to, both, capture environmental information associated with information handling system 100 and to transmit the captured environmental information to one or more devices of information handling system 100 for analysis. In other embodiments, sensors 140 may be or include one or more motion sensors, power failure sensors, voltage sensors, current sensors, smoke sensors, and/or any combination of sensors suitable for capturing information associated with information handling system 100.

In one embodiment, sensors 140 may be or include one or more humidity sensors operable to measure an amount of water vapor, or a "humidity level," present in information handling system 100. In this embodiment, sensors 140 may capture the humidity level of information handling system 100 and may transmit the captured humidity level to one or more devices of information handling system 100 for analysis. For example, sensors 140 may be or include one or more hygrometers operable to capture data indicating a humidity level, or "humidity level data," present within one or more chassis of information handling system 100 and to transmit the captured humidity level data to humidity controller 110. Humidity controller 110 may receive the humidity level data from sensors 140 and may determine a humidity level of information handling system based on the humidity level data, accordingly.

In one embodiment, sensors 140 may be or include one or more corrosion sensors operable to measure a rate of corrosion, or a "corrosion level," present in information handling system 100. In this embodiment, sensors 140 may capture the corrosion level of information handling system 100 and may transmit the captured corrosion level to one or more devices of information handling system 100 for analysis. For example, sensors 140 may be or include one or more corrosion sensors operable to capture data indicating a corrosion level, or "corrosion level data," present within one or more printed circuit boards (PCBs) and/or devices within, or communicably coupled to, information handling system 100 and to transmit the captured corrosion level data to humidity controller 110. Humidity controller 110 may receive the corrosion level data from sensors 140 and may determine a corrosion level of information handling system based on the corrosion level data, accordingly.

In one embodiment, each fan 145 (collectively referred to herein as "fans 145") may be a suitable system, apparatus, or device operable to cause airflow within information handling system 100. In particular, fans 145 may be disposed throughout information handling system 100 such that fans 145 may be activated, or otherwise placed in an on state, to increase and/or decrease airflow to components and/or a temperature of the components within information handling system 100. Similarly, fans 145 may be deactivated, or otherwise placed in an off state, to increase and/or decrease airflow to components and/or a temperature of the components within information handling system 100. In one embodiment, fans 145 may be disposed proximate to an inlet of information handling system 100 to cause an incoming airflow to enter information handling system 100 via the inlet. For example, fan 145 may be disposed proximate to inlet 220 illustrated in FIGS. 2A, 2B, and/or 2C to cause an incoming airflow to be received by a sound field chamber 200 coupled to information handling system 100. In one embodiment, fans 145 may be or include one or more server rack enclosure fans. In other embodiments, fans 145 may be or include rack mount fan trays, case fans, power supply unit (PSU) fans, central processing unit (CPU) fans, hard drive cooling fans, and/or any combination of fans suitable for causing airflow within information handling system 100.

In one embodiment, sound source 105 may be a suitable system, apparatus, or device operable to cause a humidity level within an incoming airflow received by information handling system 100 to be reduced. In particular, sound source 105 may be or include one or more electroacoustic transducers operable to generate a sound field causing an acoustic agglomeration in water vapor comprising the humidity level, thereby causing the humidity level in the incoming airflow to decrease. Specifically, water molecules comprising the water vapor may coalesce into clusters, or droplets, in response to prolonged exposure to sound waves (e.g., progressive sound waves, reflected sound waves, and/or combinations of progressive and reflected sound waves) within the sound field generated by sound source 105. That is, water vapor within the incoming airflow may become entrained in the sound field, collide, and may begin to condense to form small droplets of water. The small droplets may continue to increase in size with exposure to the sound field. As the droplets increase in size, gravity may cause the droplets to fall, thereby removing the water vapor from the incoming airflow and decreasing the humidity level therein. In one embodiment, sound source 105 may be or include a loudspeaker disposed within an acoustic chamber (e.g., sound field chamber 200 shown in FIGS. 2A-2C). In other embodiments, sound source 105 may be or include a midrange speaker, ultrasonic speaker, high-frequency speaker, low-frequency speaker, piezoelectric speaker, and/or any other type of sound source suitable for generating a sound field comprised of sound waves to cause an acoustic agglomeration in water vapor. Sound source 105 is described in further detail with respect to FIGS. 2A-3.

In one embodiment, humidity controller 110 may be a suitable system, apparatus, or device operable to manage a humidity level in information handling system 100. In particular, humidity controller 110 may cause a decrease in a humidity level in information handling system 100 to reduce corrosion of one or more devices disposed, or otherwise installed, within information handling system 100. Conventionally, fresh air cooling methods used to decrease the ambient temperature of an information handling system may direct an outdoor air stream through the information handling system, thereby cooling the information handling system as the outdoor air stream flows. However, outdoor air streams may carry high levels of humidity, causing water within the outdoor air streams to condense and form multiple layers of water that adhere to various devices within the information handling system. Specifically, outdoor air streams having a high RH (e.g., greater than 50% RH) may cause multiple monolayers of water to coat the surfaces of various devices (e.g., PCBs, microcontrollers, FPGAs, CPLDs, and the like) within the information handling systems. In polluted environments, the outdoor air streams may additionally carry gaseous pollutants (e.g., $Cl_2$, $H_2S$, $SO_2$, $O_3$, and the like), causing pollutant molecules within the outdoor air streams to become absorbed into the multiple layers of water coating devices within the information handling system. This may result in corrosion of the devices over time, which may cause nondeterministic behavior in the devices and eventual failure. Replacing corroded devices may require increased cost and maintenance for users, thereby decreasing user experience and overall system efficiency.

In contrast, humidity controller 110 may mitigate the increased humidity levels associated with fresh air cooling methods to reduce corrosion in information handling system 100. In particular, humidity controller 110 may identify a humidity level (e.g., captured by sensors 140) of an incoming airflow received by information handling system 100 and may then determine whether the humidity level is greater than, or equal to, a humidity level in which corrosion may occur, or a "threshold humidity level." In one embodiment, the threshold humidity level may be or include a numerical value indicating a specific humidity in grams of water vapor per kilogram of air ($g \cdot kg^{-1}$). In another embodiment, the threshold humidity level may be or include a numerical value indicating an absolute humidity in grams of water vapor per cubic meter of air ($g \cdot m^{-3}$). In yet another embodiment, the threshold humidity level may be or include an RH percentage comprised of a ratio between a quantity of moisture in the air (i.e., actual water vapor density) to the maximum quantity of moisture the air can withstand (i.e., saturation water vapor density). For example, a threshold humidity level may be or include an RH percentage of 50%. In one embodiment, the threshold humidity level may be stored in one or more memory devices of information handling system 100. For example, the threshold humidity level may be stored in local storage resource 130 such that humidity controller 110 may access local storage resource 130 to identify the threshold humidity level in response to receiving humidity level data from sensors 140. In another embodiment, the threshold humidity level may be stored in a memory device local to, or within, humidity controller 110.

In one embodiment, humidity controller 110 may determine whether the humidity level of an incoming airflow used to cool one or more devices disposed, or otherwise installed, within information handling system 100 is greater than, or equal to, the threshold humidity level. In particular, humidity controller 110 may receive humidity level data from sensors 140 and may determine the humidity level of information handling system 100 based on the humidity level data. Humidity controller 110 may then access one or more memory devices of information handling system 100 (e.g., memory subsystem 120, local storage resource 130, local memory device within humidity controller 110, and the like) to identify the threshold humidity level. Humidity controller 110 may then compare the humidity level of information handling system 100 to the threshold humidity level to determine whether the incoming airflow includes a humidity level that is greater than, or equal to, the threshold humidity level. For example, humidity controller 110 may execute one or more mathematical operations to compare the humidity level to the threshold humidity level to determine whether the humidity level is greater than, or equal to, the threshold humidity level.

In one embodiment, humidity controller 110 may cause sound source 105 to generate a sound field within information handling system 100 in response to determining that the humidity level is greater than, or equal to, the threshold humidity level. In particular, humidity controller 110 may access one or more memory devices (e.g., memory subsystem 120, local storage resource 130, local memory device within humidity controller 110, and the like) to identify parameters indicating a frequency, or an "acoustic frequency," and/or an amplitude, or a "sound pressure level," at which the sound field is to be generated. For example, humidity controller 110 may access a library of numeric parameters, or settings, stored in local storage resource 130 indicating an acoustic frequency (numeric parameter having Hz units) and/or a sound pressure level (numeric parameter having Pa units) at which sound source 105 may generate a sound field. In one embodiment, acoustic frequency and/or sound pressure level parameters may be indicated to an administrator and/or manufacturer (e.g., a manufacturer of information handling system 100) by a user and/or business enterprise based on specific humidity levels present within information handling systems used by the user and/or business enterprise. For example, a small business enterprise located in the United States may include a single information handling system 100 that receives incoming airflow having low humidity levels. In this example, the small business enterprise may indicate to an administrator and/or manufacturer that a high, and/or ultrasonic, acoustic frequency and/or low sound pressure level may suffice in decreasing humidity levels below threshold humidity levels in the incoming airflow received by the single information handling system 100. In contrast, a large business enterprise located in India may include several information handling systems 100 that each receive incoming airflow having high humidity levels. In this example, the large business enterprise may indicate to an administrator and/or manufacturer that a low acoustic frequency and/or high sound pressure level may be required to decrease humidity levels below threshold humidity levels in incoming airflow received by each of the several information handling systems 100.

In one embodiment, humidity controller 110 may cause sound source 105 to generate the sound field based on the acoustic frequency and the sound pressure level. The sound field may cause an acoustic agglomeration of the water vapor comprising the humidity level of the incoming airflow. The acoustic agglomeration may cause the humidity level to decrease, thereby mitigating the formation of water layers—and pollutant molecules therein—that collect on devices within information handling system 100. For example, the acoustic agglomeration may cause the humidity level to decrease by approximately 70-80% within an incoming airflow. By mitigating increases in humidity levels and reducing corrosion, humidity controller 110 may increase the lifecycle of information handling system 100, thereby decreasing the cost and maintenance associated with replacing corroded devices while increasing user experience and overall system efficiency. Humidity controller 110 is described in further detail with respect to FIGS. 2A-3.

Figure 2B:
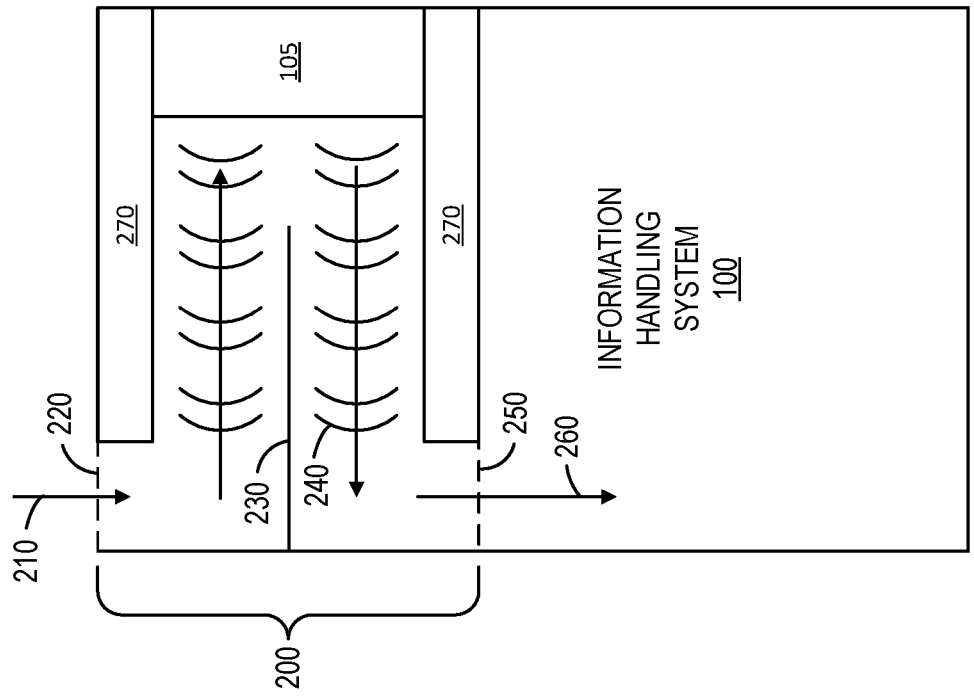
FIGS. 2A, 2B, and 2C are block diagrams of selected elements of embodiments of sound field chambers coupled to an information handling system.
Figure 2A:
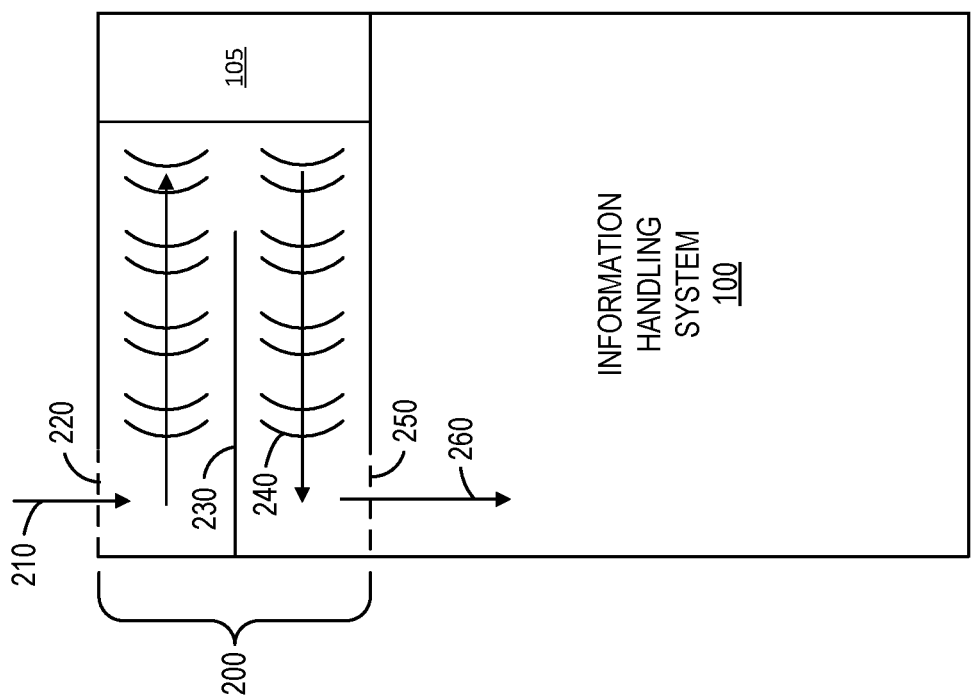
Figure 2C:
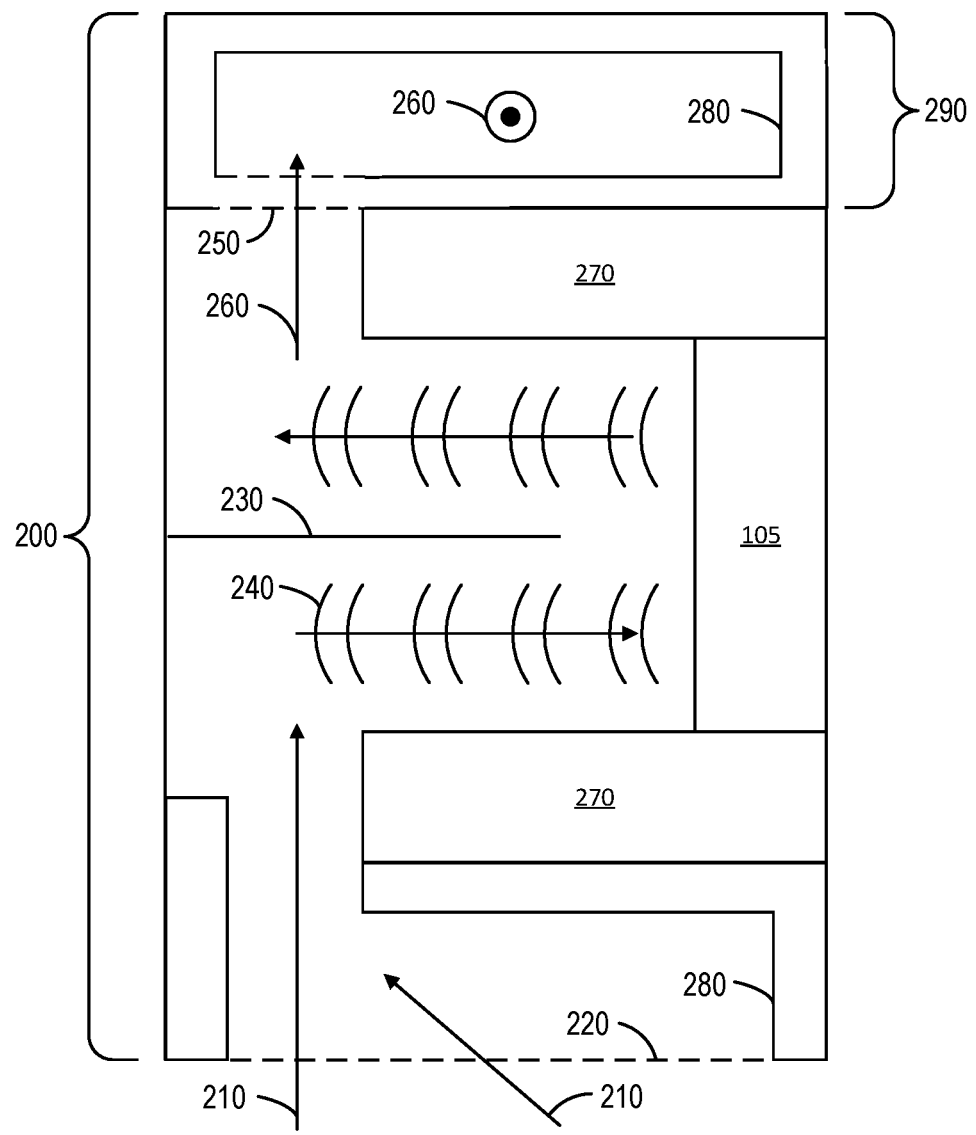
Figure 4:
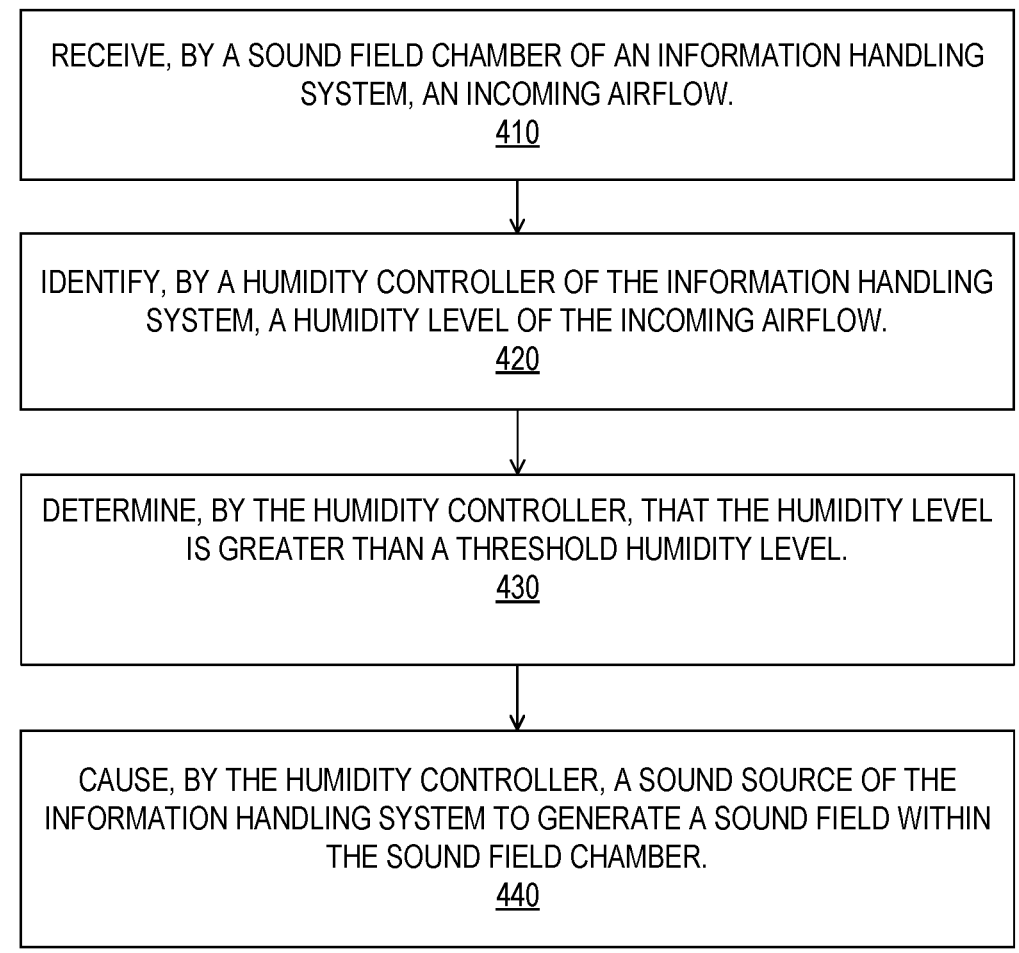
FIG. 4 is a flowchart depicting selected elements of an embodiment of a method for decreasing a humidity level in an information handling system.

FIGS. 2A, 2B, and 2C are block diagrams of selected elements of embodiments of sound field chambers coupled to an information handling system. Specifically, FIG. 2A illustrates a top view of a sound field chamber 200 coupled to information handling system 100 that includes an ultrasonic sound source 105. FIG. 2B illustrates a top view of a sound field chamber 200 coupled to information handling system 100 that includes a high-frequency sound source 105. FIG. 2C illustrates a top view of a sound field chamber 200 coupled to information handling system 100 (not shown in figure) that includes a low-frequency sound source 105. Other embodiments of sound field chambers 200 may include additional, fewer, and/or different components than the components shown in the embodiment illustrated in FIGS. 2A-2C.

In the embodiment illustrated in FIG. 2A, sound field chamber 200 includes an inlet 220, a sound source 105, a dividing wall 230, and an outlet 250. Sound field chamber 200 may receive incoming airflow 210 via inlet 220. For example, inlet 220 may include one or more fans 145 (shown in FIG. 1) operable to draw in surrounding air to generate incoming airflow 210. In this embodiment, incoming airflow 210 may include a humidity level corresponding to an amount of water vapor in the incoming airflow that may cause corrosion of devices over time, which may cause nondeterministic behavior in the devices and eventual failure. Humidity controller 110 may identify the humidity level of incoming airflow 210 based on humidity level data captured by sensors 140 (shown in FIG. 1) and may determine whether the humidity level is greater than, or equal to, the threshold humidity level as described above with respect to FIG. 1. In response to determining that the humidity level is greater than, or equal to, the threshold humidity level, humidity controller 110 may cause sound source 105 to generate a sound field comprised of sound waves 240.

In the embodiment illustrated in FIG. 2A, sound source 105 may generate an ultrasonic frequency (e.g., greater than 20 kHz). Such ultrasonic frequencies may be inaudible to users, therefore allowing for minimal architecture within sound field chamber 200. As shown in FIG. 2A, the incoming airflow 210 passes through the sound waves 240 within the sound field chamber 200. In response to exposure to the sound waves 240, water vapor within the incoming airflow 210 may become entrained in the sound field, collide, and may begin to condense to form small droplets of water. The small droplets may continue to increase in size with exposure to the sound field. To prolong exposure to the sound waves 240, sound field chamber 200 includes dividing wall 230 to cause the incoming airflow 210 to follow an increased path length as the sound waves 240 cause acoustic agglomeration within the incoming airflow 210. As droplets within the incoming airflow 210 increase in size, gravity may cause the droplets to fall, thereby removing the water vapor from the incoming airflow 210 and decreasing the humidity level therein. As such, outgoing airflow 260 may be supplied to information handling system 100 via outlet 250 such that humidity levels within information handling system 100 may be maintained below the threshold humidity level (e.g., less than 50% RH).

In the embodiment illustrated in FIG. 2B, sound field chamber 200 includes an inlet 220, a sound source 105, a dividing wall 230, and an outlet 250 as described above with respect to FIG. 2A. However, in the embodiment illustrated in FIG. 2B, sound source 105 may generate a high frequency (e.g., 10-20 kHz). Such high frequencies may be audible to users, therefore requiring additional architecture within sound field chamber 200 to suppress the audible high frequencies generated by sound source 105. This is shown in FIG. 2B where sound field chamber 200 includes side branch resonators 270 disposed along two inside surfaces of sound field chamber 200 to attenuate sound waves 240 within the sound field chamber 200 such that the sound waves 240 may be attenuated substantially. As described above with respect to FIG. 2A, water vapor within the incoming airflow 210 may become entrained in the sound field, collide, and may begin to condense to form small droplets of water. The small droplets may continue to increase in size with exposure to the sound field. To prolong exposure to the sound waves 240, sound field chamber 200 includes dividing wall 230 to cause the incoming airflow 210 to follow an increased path length as the sound waves 240 cause acoustic agglomeration within the incoming airflow 210. As droplets within the incoming airflow 210 increase in size, gravity may cause the droplets to fall, thereby removing the water vapor from the incoming airflow 210 and decreasing the humidity level therein. As such, outgoing airflow 260 may be supplied to information handling system 100 via outlet 250 such that humidity levels within information handling system 100 may be maintained below the threshold humidity level (e.g., less than 50% RH).

In the embodiment illustrated in FIG. 2C, sound field chamber 200 includes an inlet 220, a sound source 105, a dividing wall 230, and an outlet 250 as described above with respect to FIG. 2A. However, in the embodiment illustrated in FIG. 2C, sound source 105 may generate a low frequency (e.g., less than 5 kHz). Such low frequencies may be audible and/or distracting to users, therefore requiring additional architecture within sound field chamber 200 to suppress the audible low frequencies generated by sound source 105. This is shown in FIG. 2C where sound field chamber 200 includes side branch resonators 270 disposed along two inside surfaces of sound field chamber 200 to attenuate sound waves 240 within the sound field chamber 200 such that the sound waves 240 may be attenuated substantially. In addition, sound field chamber 200 includes several passive mufflers 280 disposed proximate to inlet 220 and outlet 250. In one embodiment, passive mufflers 280 may be or include a foam material operable to further muffle, or suppress, the audible low frequencies generated by sound source 105. As shown in FIG. 2C, sound field chamber 200 may additionally include an encased air passage 290 such that outgoing airflow 260 may enter the encased air passage 290 via outlet 250. The encased air passage 290 may be lined, or otherwise encased, with passive mufflers 280 to attenuate the amplitude of audible low frequencies exiting sound field chamber 200 as the outgoing airflow 260 travels within the encased air passage 290 to be received by one or more information handling systems 100.

As described above with respect to FIG. 2A, water vapor within the incoming airflow 210 may become entrained in the sound field, collide, and may begin to condense to form small droplets of water. The small droplets may continue to increase in size with exposure to the sound field. To prolong exposure to the sound waves 240, sound field chamber 200 includes dividing wall 230 to cause the incoming airflow 210 to follow an increased path length as the sound waves 240 cause acoustic agglomeration within the incoming airflow 210. As droplets within the incoming airflow 210 increase in size, gravity may cause the droplets to fall, thereby removing the water vapor from the incoming airflow 210 and decreasing the humidity level therein. As such, outgoing airflow 260 may be supplied to information handling system 100 via outlet 250 such that humidity levels within information handling system 100 may be maintained below the threshold humidity level (e.g., less than 50% RH). Specifically, outgoing airflow 260 may pass vertically (as indicated by the outward arrow representing outgoing airflow 260 within encased air passage 290) through encased air passage 290 to be distributed to one or more information handling systems 100. For example, sound field chamber 200 may be disposed underneath one or more information handling systems 100 (i.e., under the floor) of a business enterprise such that outgoing airflow 260 may be distributed to each of the one or more information handling systems 100 above via encased air passage 290.

FIG. 3 is a block diagram of selected elements of an embodiment of a sound field chamber that includes one or more condensation structures. In particular, FIG. 3 illustrates a side view of sound field chamber 200 (e.g., shown in FIGS. 2A, 2B, and 2C) that includes one or more condensation structures 300-A through 300-E (collectively referred to herein as "condensation structures 300") disposed throughout sound field chamber 200. Each condensation structure 300 may be or include a rigid, hydrophilic material operable to cause a condensation in water vapor within incoming airflow 210 as the incoming airflow 210 passes through sound field chamber 200. That is, each condensation structure 300 may be disposed vertically and angled slightly (e.g., approximately 80° relative to drain 310) within sound field chamber 200 to accommodate variations in droplet size distributions and acoustic frequencies. Specifically, each condensation structure 300 may be angled slightly in relation to sound source 105 to increase exposure areas in the sound field onto which droplets may condensate. As shown in FIG. 3, sound field chamber 200 may additionally include a drain 310 disposed on a bottom surface of sound field chamber 200 to receive droplets that have formed on condensation structures 300 and have fallen from the incoming airflow 210 due to gravity, thereby removing the water vapor from the incoming airflow 210 and decreasing the humidity level therein. In one embodiment, drain 310 may route the collected droplets out of sound field chamber 200 and/or information handling system 100 such that the collected droplets may evaporate in the surrounding computing environment 155.

FIG. 4 is a flowchart depicting selected elements of an embodiment of a method for decreasing a humidity level in an information handling system. It is noted that certain operations described in method 400 may be optional or may be rearranged in different embodiments.

Method 400 may begin at step 410, where a sound field chamber of the information handling system receives an incoming airflow. The incoming airflow may include a humidity level corresponding to an amount of water vapor in the incoming airflow. For example, sound field chamber 200 may receive incoming airflow 210 via inlet 220 as described above with respect to FIG. 2A. The incoming airflow 210 may include a humidity level corresponding to an amount of water vapor in the incoming airflow that may cause corrosion of devices over time, which may cause nondeterministic behavior in the devices and eventual failure as described above with respect to FIG. 2A. At step 420, a humidity controller of the information handling system may identify the humidity level of the incoming airflow. For example, humidity controller 110 may identify the humidity level of incoming airflow 210 based on humidity level data captured by sensors 140 as described above with respect to FIG. 2A. At step 430, the humidity controller may determine that the humidity level is greater than a threshold humidity level. For example, humidity controller 110 may execute one or more mathematical operations to compare the humidity level to the threshold humidity level to determine whether the humidity level is greater than, or equal to, the threshold humidity level as described above with respect to FIG. 1. At step 440, the humidity controller may cause a sound source of the information handling system to generate a sound field within the sound field chamber. The sound field may be comprised of sound waves. The sound waves may cause an acoustic agglomeration of the water vapor. The acoustic agglomeration may cause the humidity level in the incoming airflow to decrease. For example, in response to determining that the humidity level is greater than, or equal to, the threshold humidity level, humidity controller 110 may cause sound source 105 to generate a sound field comprised of sound waves 240 (i.e., progressive sound waves, reflected sound waves, and/or combinations of progressive and reflected sound waves) as described above with respect to FIG. 2A. Each sound pressure wave may cause an acoustic agglomeration of the water vapor comprising the humidity level of the incoming airflow as described above with respect to FIG. 1. The acoustic agglomeration may cause the humidity level to decrease, thereby mitigating the formation of water layers—and pollutant molecules therein—that collect on devices within information handling system 100 as described above with respect to FIG. 1.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for decreasing a humidity level in an information handling system, the method comprising:
   receiving, by a sound field chamber of the information handling system, an incoming airflow, the incoming airflow having a humidity level corresponding to an amount of water vapor in the incoming airflow;
   identifying, by a humidity controller of the information handling system, the humidity level of the incoming airflow;
   determining, by the humidity controller, that the humidity level is greater than a threshold humidity level; and
   in response to determining that the humidity level is greater than the threshold humidity level:
   causing, by the humidity controller, a sound source of the information handling system to generate a sound field within the sound field chamber, the sound field comprised of sound waves, the sound waves causing an acoustic agglomeration of the water vapor, the acoustic agglomeration causing the humidity level to decrease.

2. The method of claim 1, wherein identifying the humidity level of the incoming airflow comprises:
   receiving, by the humidity controller, humidity level data from one or more sensors of the information handling system, the humidity level data captured by the one or more sensors; and
   determining, by the humidity controller, the humidity level based on the humidity level data.

3. The method of claim 1, wherein determining that the humidity level is greater than the threshold humidity level comprises:
   accessing, by the humidity controller, a local storage resource of the information handling system, the local storage resource storing the threshold humidity level;
   identifying, by the humidity controller, the threshold humidity level; and
   comparing, by the humidity controller, the humidity level to the threshold humidity level.

4. The method of claim 1, wherein causing the sound source to generate the sound field comprises:
   accessing, by the humidity controller, a local storage resource of the information handling system, the local storage resource storing an acoustic frequency and a sound pressure level, the acoustic frequency and the sound pressure level associated with the sound field; and
   causing, by the humidity controller, the sound source to generate the sound field based on the acoustic frequency and the sound pressure level.

5. The method of claim 4, wherein the acoustic frequency associated with the sound field is an ultrasonic frequency.

6. The method of claim 4, wherein the acoustic frequency associated with the sound field is a high frequency.

7. The method of claim 4, wherein the acoustic frequency associated with the sound field is a low frequency.

8. The method of claim 1, the method further comprising:
   causing, by one or more condensation structures of the information handling system, a condensation in the water vapor, the one or more condensation structures disposed within the sound field chamber, the one or more condensation structures comprised of a hydrophilic material.

9. One or more computer-readable non-transitory storage media embodying software that is operable when executed to:
   identify, by a humidity controller of an information handling system, a humidity level of an incoming airflow received by a sound field chamber of the information handling system, the humidity level corresponding to an amount of water vapor in the incoming airflow;
   determine, by the humidity controller, that the humidity level is greater than a threshold humidity level; and
   in response to determining that the humidity level is greater than the threshold humidity level:
   cause, by the humidity controller, a sound source of the information handling system to generate a sound field within the sound field chamber, the sound field comprised of sound waves, the sound waves causing an acoustic agglomeration of the water vapor, the acoustic agglomeration causing the humidity level to decrease.

10. The media of claim 9, wherein to identify the humidity level of the incoming airflow, the software is further operable when executed to:
receive, by the humidity controller, humidity level data from one or more sensors of the information handling system, the humidity level data captured by the one or more sensors; and
determine, by the humidity controller, the humidity level based on the humidity level data.

11. The media of claim 9, wherein to determine that the humidity level is greater than the threshold humidity level, the software is further operable when executed to:
access, by the humidity controller, a local storage resource of the information handling system, the local storage resource storing the threshold humidity level;
identify, by the humidity controller, the threshold humidity level; and
compare, by the humidity controller, the humidity level to the threshold humidity level.

12. The media of claim 9, wherein to cause the sound source to generate the sound field, the software is further operable when executed to:
access, by the humidity controller, a local storage resource of the information handling system, the local storage resource storing an acoustic frequency and a sound pressure level, the acoustic frequency and the sound pressure level associated with the sound field; and
cause, by the humidity controller, the sound source to generate the sound field based on the acoustic frequency and the sound pressure level.

13. The media of claim 12, wherein the acoustic frequency associated with the sound field is an ultrasonic frequency.

14. The media of claim 12, wherein the acoustic frequency associated with the sound field is a high frequency.

15. The media of claim 12, wherein the acoustic frequency associated with the sound field is a low frequency.

16. A computing environment, comprising:
an information handling system including one or more processors; and
one or more computer-readable non-transitory storage media coupled to the one or more processors and comprising instructions operable when executed by the one or more processors to cause the system to:
identify, by a humidity controller of the information handling system, a humidity level of an incoming airflow received by a sound field chamber of the information handling system, the humidity level corresponding to an amount of water vapor in the incoming airflow;
determine, by the humidity controller, that the humidity level is greater than a threshold humidity level; and
in response to determining that the humidity level is greater than the threshold humidity level:
cause, by the humidity controller, a sound source of the information handling system to generate a sound field within the sound field chamber, the sound field comprised of sound waves, the sound waves causing an acoustic agglomeration of the water vapor, the acoustic agglomeration causing the humidity level to decrease.

17. The computing environment of claim 16, wherein to identify the humidity level of the incoming airflow, the one or more processors are further operable when executed to:
receive, by the humidity controller, humidity level data from one or more sensors of the information handling system, the humidity level data captured by the one or more sensors; and
determine, by the humidity controller, the humidity level based on the humidity level data.

18. The computing environment of claim 16, wherein to determine that the humidity level is greater than the threshold humidity level, the one or more processors are further operable when executed to:
access, by the humidity controller, a local storage resource of the information handling system, the local storage resource storing the threshold humidity level;
identify, by the humidity controller, the threshold humidity level; and
compare, by the humidity controller, the humidity level to the threshold humidity level.

19. The computing environment of claim 16, wherein to cause the sound source to generate the sound field, the one or more processors are further operable when executed to:
access, by the humidity controller, a local storage resource of the information handling system, the local storage resource storing an acoustic frequency and a sound pressure level, the acoustic frequency and the sound pressure level associated with the sound field; and
cause, by the humidity controller, the sound source to generate the sound field based on the acoustic frequency and the sound pressure level.

20. The computing environment of claim 19, wherein the acoustic frequency associated with the sound field is an ultrasonic frequency.

* * * * *